United States Patent [19]

Jung

[11] Patent Number: 5,478,701
[45] Date of Patent: Dec. 26, 1995

[54] METHOD FOR FABRICATING A READ ONLY OPTICAL DISC

[75] Inventor: Seung-tae Jung, Seoul, Rep. of Korea

[73] Assignee: Samsung Electronics Co., Ltd., Kyungki-do, Rep. of Korea

[21] Appl. No.: 242,998

[22] Filed: May 16, 1994

Related U.S. Application Data

[63] Continuation of Ser. No. 997,757, Dec. 30, 1992, abandoned.

[30] Foreign Application Priority Data

Apr. 30, 1992 [KR] Rep. of Korea .................. 92-7409

[51] Int. Cl.$^6$ ..................................................... G11B 7/26
[52] U.S. Cl. ..................... 430/321; 430/962; 430/945; 355/77; 355/50
[58] Field of Search .................. 430/321, 962, 430/945; 355/31, 50, 77; 369/84, 85

[56] References Cited

U.S. PATENT DOCUMENTS

| | | | |
|---|---|---|---|
| 3,579,252 | 5/1971 | Goodman | 358/902 |
| 3,979,591 | 9/1976 | Silverman | 430/945 |
| 4,050,811 | 9/1977 | Russell | 355/46 |
| 4,304,848 | 12/1981 | Bouldin et al. | 430/401 |
| 4,839,251 | 6/1989 | Ohta et al. | 430/5 |
| 4,943,126 | 7/1990 | Lang et al. | 365/125 |
| 4,953,152 | 8/1990 | Ito | 369/44.39 |
| 4,980,262 | 12/1990 | Thomas et al. | 430/141 |
| 5,114,531 | 5/1992 | Fukushima et al. | 156/659.1 |
| 5,289,231 | 2/1994 | Magome et al. | 355/53 |
| 5,309,197 | 5/1994 | Mori et al. | 355/53 |

FOREIGN PATENT DOCUMENTS

| | | |
|---|---|---|
| 0447711 | 9/1991 | European Pat. Off. . |
| 61-156124 | 7/1986 | Japan . |
| 62-217443 | 9/1987 | Japan . |
| 3-17443 | 1/1991 | Japan . |
| 3-171433 | 7/1991 | Japan . |
| 4-103048 | 4/1992 | Japan . |

OTHER PUBLICATIONS

English Language Abstract of JP 3–17443, Yamamuto et al., (Jan. 1991).

*Primary Examiner*—Charles L. Bowers, Jr.
*Assistant Examiner*—John A. McPherson
*Attorney, Agent, or Firm*—Lowe, Price, LeBlanc & Becker

[57] ABSTRACT

A method and apparatus for fabricating a read only optical disc enables mass production of a read only optical disc at low cost in a short period of time. The method includes a source disc fabricating step and a duplicating step of duplicating information of the source disc to a target disc. The source disc has a transparent substrate and a predetermined opaque write layer coated thereon, and write holes for transmitting light on the write layer, thereby storing information according to the arrangement of the write holes. The target disc has a photochromic write layer which has different absorption coefficients before and after the duplication. Here, the method uses an optical writing apparatus for optically forming the write holes of the source disc and a duplicating apparatus for optically duplicating the information from the source disc to the target disc.

3 Claims, 9 Drawing Sheets

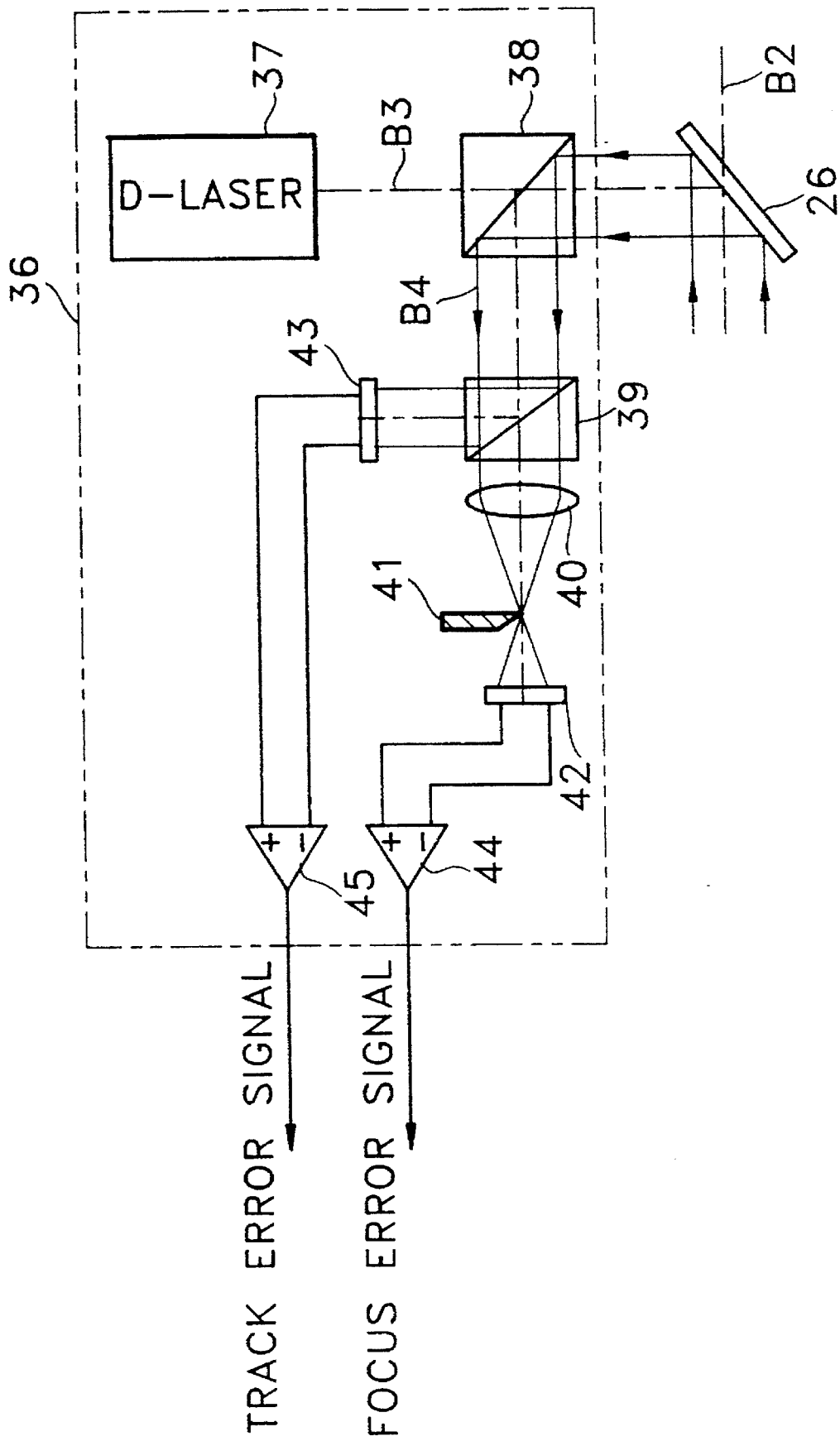

5,478,701

METHOD FOR FABRICATING A READ ONLY OPTICAL DISC

This application is a continuation of application Ser. No. 07/997,757 filed Dec. 30, 1992, now abandoned.

BACKGROUND OF THE INVENTION

The present invention relates to a method and apparatus for fabricating a read only optical disc such as compact discs and video discs, and more particularly to a method and apparatus for fabricating a read only optical disc for performing optical duplication by utilizing a source disc wherein write holes for transmitting light are arranged depending on information and a target disc having a photochromic write layer, to thereby provide the duplicated target disc as a read only optical disc.

Besides compact discs and video discs currently in wide use, CD-ROMs having character information, and compact video discs wherein video and audio signals are written, being distributed on an area of a regular ratio can be given as examples of read only optical discs. These discs generally has a mirror for reflecting light and countless write pits formed in the mirror surface. Upon projecting light to such a disc, the mirror surface without write pits brightly reflects the light, while the write pits reflect a slightly dimmed light beam. The radiation intensity in the reflected light is thus varied by scanning, so that the information can be read out by detecting this variance.

All fabricating processes of the above-described read only discs are basically similar. Here, a fabricating process of a compact disc is shown in FIG. 1, which includes a master fabrication step 100, a stamper fabrication step 200, a disc substrate molding step 300, and post-processing step 400.

To begin with, in master fabrication, a photoresist 2 is coated on a glass disc 1 with a well-ground surface, and a master 4 formed with write pits 3 is fabricated by cutting photoresist 2 via exposure and development according to the information to be written. Here, an apparatus called as a "mastering machine" (refer to U.S. Pat. No. 4,953,152) is utilized dung the cutting process, wherein a modulated laser beam is projected which carries the desired information, thereby exposing the corresponding portions of write pits 3.

In stamper fabrication, a metal layer 5 is thinly deposited on master 4, and a nickel layer 6 and a metal substrate 7 are sequentially formed on metal layer 5. Then, master 4 is separated to thereby complete a stamper 8.

In disc substrate molding, an ultraviolet-curing resin 10 is injected between stamper 8 and a plate member, 9 and pressed. Then, an ultraviolet ray is projected. Thereafter, when stamper 8 and plate member 9 are separated from each other, a hardened disc substrate 11 having write pits 3' (which are the same as master 4) is obtained.

Next, an aluminum reflective layer 12, a protection layer 13 and a label 14 are sequentially formed on disc substrate 11. Then, by carrying out post-processing, e.g., the formation of a center hole 15, a compact disc 16 is completed.

Any of the above-described processes must be strictly managed in a clean room. Especially in the master fabrication, since the thickness of the photoresist is 0.12 μm which must be processed within an error range of ±5 nm, ambient concerns (i.e., dust, small variations in temperature and humidity, vibration, etc.) are more strict than those maintained curing semiconductor manufacturing processes. In cutting, since the width (e.g., 0.4 μm) and interval (e.g., 1.6 μm) of a track in which write pits are formed are very minute, a costly and highly accurate mastering machine having advanced control-performance must be employed so as to precisely project the laser beam. In disc substrate molding, a highly developed molding technique is required for forming submicron write pits in the disc substrate. In the meantime, the number of disc substrates moldable by a single stamper is limited due to the abrasion of the stamper.

In other words, the conventional method for fabricating a read only optical disc requires several process steps and the use of an expensive apparatus and advanced technique, which is not economical. Accordingly, a read only optical disc cannot be supplied at a low price. Also, the read only optical disc is difficult to be practically fabricated on a short-run production basis.

SUMMARY OF THE INVENTION

It is a first object of the present invention to provide a simple method for fabricating an optical disc capable of the economical mass-producing of a read only optical disc in a short time.

It is a second object of the present invention to provide a source disc storing information which can be optically duplicated on a target disc.

It is a third object of the present invention to provide a simple optical writing apparatus for fabricating the source disc storing information which can be optically duplicated on a target disc.

It is a fourth object of the present invention to provide a duplication apparatus for optically duplicating information from a source disc to a target disc.

To achieve the first object of the present invention, there is provided a method for fabricating a read only optical disc comprising:

a source disc fabricating step of coating a predetermined opaque write layer on a transparent glass substrate, and forming write holes for transmitting light in the write layer according to information, to thereby fabricate a source disc storing the information; and a duplicating step of projecting the light on one side of the source disc to thereby duplicate information by exposing a target disc having a photochromic write layer to the light which transmits through the write holes.

To achieve the second object of the present invention, there is provided a source disc comprising:

a light-transmitting substrate which transmits light;

an opaque write layer coated on one side of the substrate; and write holes for transmitting the light through the write layer, the source disc thereby storing information depending on the arrangement of the write holes.

To achieve the third object of the present invention, there is provided an optical writing apparatus for projecting light on a source disc medium formed by coating an opaque write layer capable of being evaporated by heating on a light-transmitting substrate in order to form write holes for transmitting the light in the write layer, the apparatus comprising:

disc driving means for rotating and horizontally moving the source disc medium;

optical mechanism for focusing and projecting a light beam having a heat energy capable of heating and evaporating the opaque write layer on the source disc medium, after modulating the light beam according to desired information; and optical detecting means for projecting light with a low heat energy on the source disc medium, and sensing reflected light from the source disc to detect focus and track error signals of the light converted on the source disc medium.

To achieve the fourth object of the present invention, there is provided a duplication apparatus for duplicating information stored in write holes of a source disc to a target disc having a photochromic write layer, the source disc having a light-transmitting substrate and an opaque write layer having the write holes therein, and storing the information according to the arrangement of the write holes, the apparatus comprising:

driving means for rotating and horizontally moving the source disc and target disc;

light projecting means for projecting light on one side of the source disc; and light transferring means for allowing the light transmitted through the write holes of the source disc to travel to the target disc.

That is, by fabricating a read only optical disc by means of source disc fabrication and its duplication, the present invention will greatly contribute to mass production of the optical disc. The source disc obtained during source disc fabrication stores information by transmitting the light. The source disc can be permanently preserved, and utilized in duplicating process, as required. Also, land may be formed in advance in the source disc medium along the spiral tracks, which enables the simple optical writing apparatus to carry out optical writing without error. For duplication, the copy function is optically performed by utilizing a target disc having a photochromic write layer, so that the information of the source disc is duplicated. The target disc having the duplicated information is utilized as a read only optical disc.

BRIEF DESCRIPTION OF THE DRAWINGS

The above objects and other advantages of the present invention will become more apparent by describing in detail a preferred embodiment thereof with reference to the attached drawings in which:

FIG. 4 is a detail view showing an optical detector of the optical writing apparatus shown in FIG. 3;

DETAILED DESCRIPTION OF THE PREFERRED EMBODIMENTS

A method for fabricating a read only optical disc according to the present invention includes disc fabrication and duplication thereof.

Figure 1:
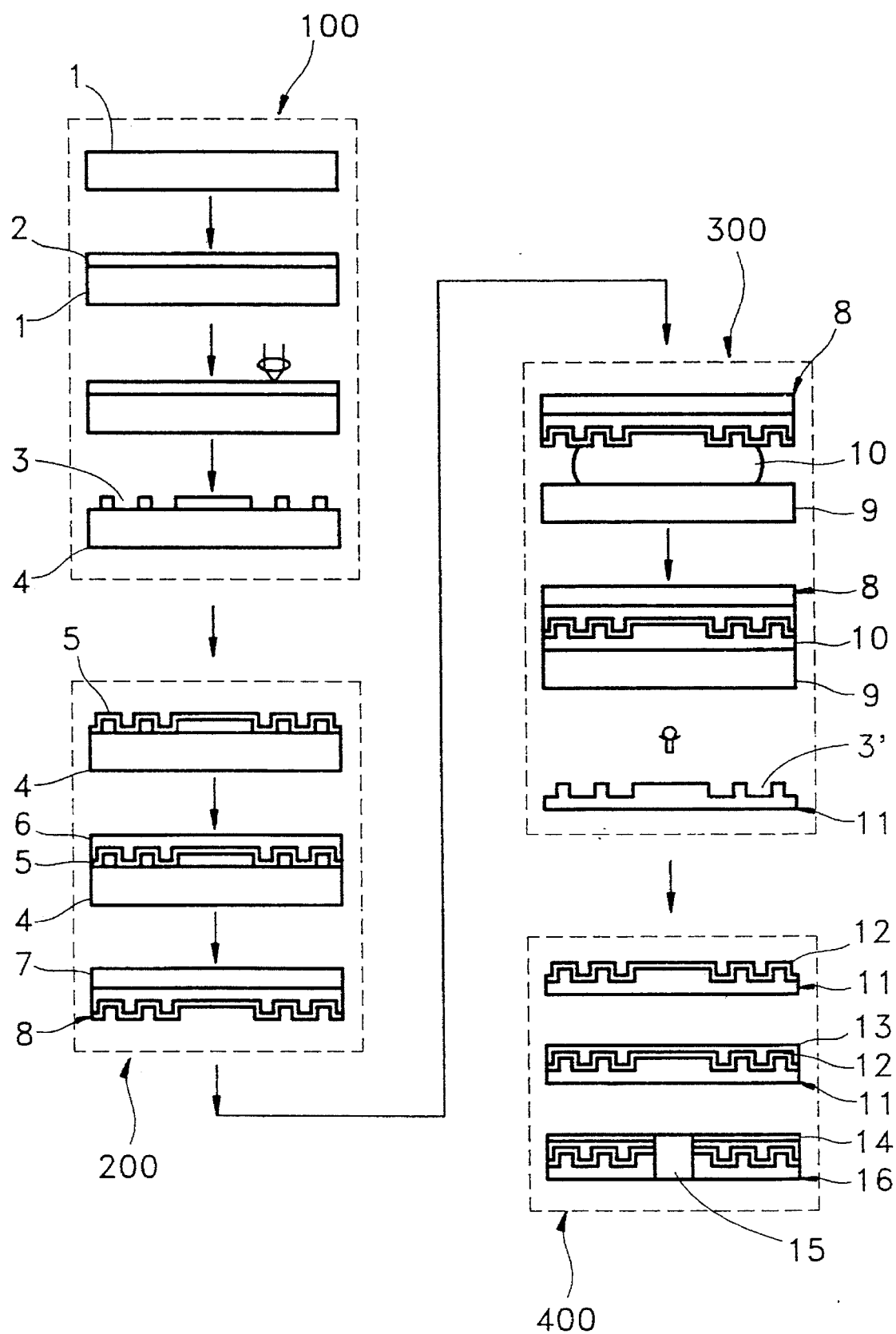
FIG. 1 shows the fabricating process simply illustrating a conventional method for fabricating a compact disc.
Figure 2A:
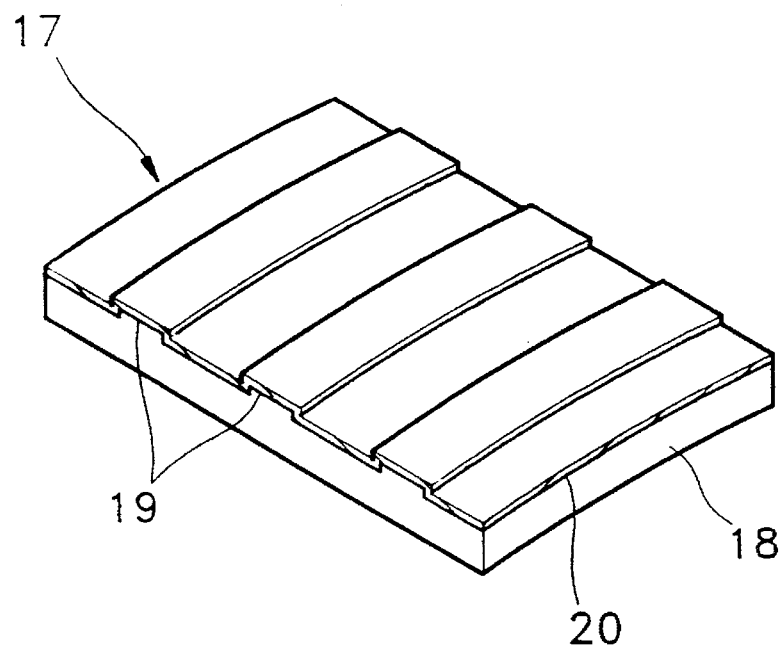
FIGS. 2A and 2B are perspective views respectively showing a source disc medium according to the present invention, and a preferred structure of source disc storing information.
Figure 2B:
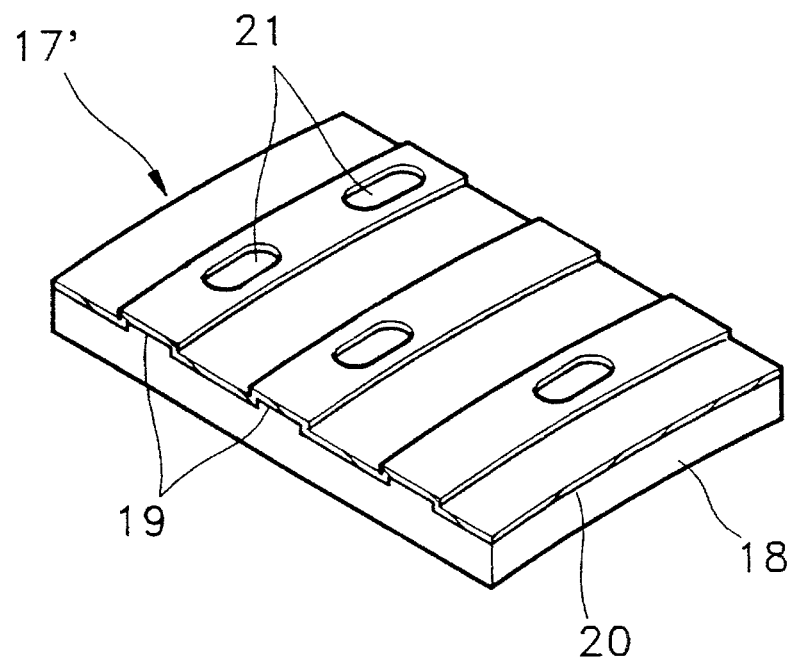
Figure 3:
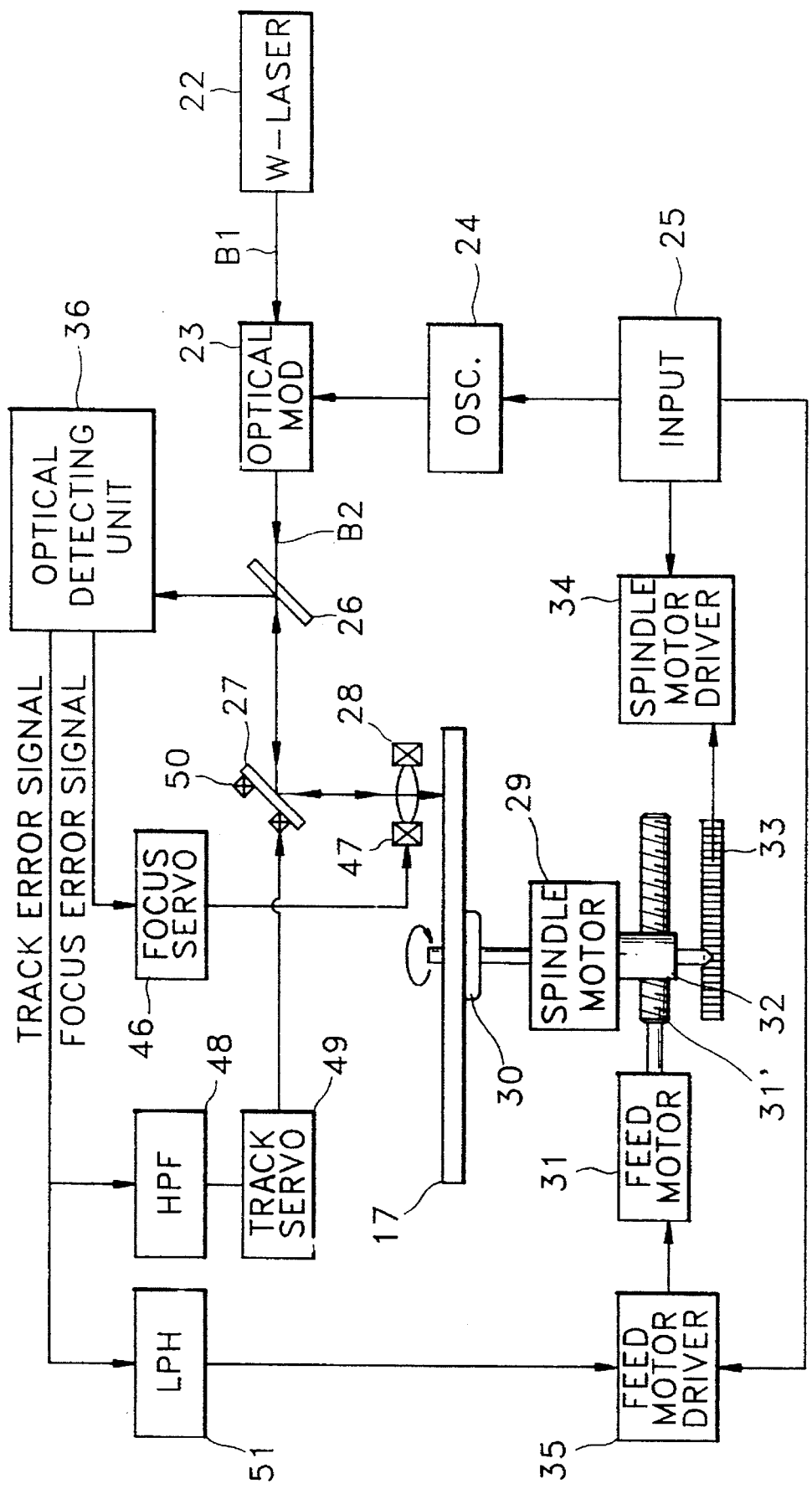
FIG. 3 is a block diagram showing an optical writing apparatus for writing information on a source disc medium according to the present invention.
Figure 9:
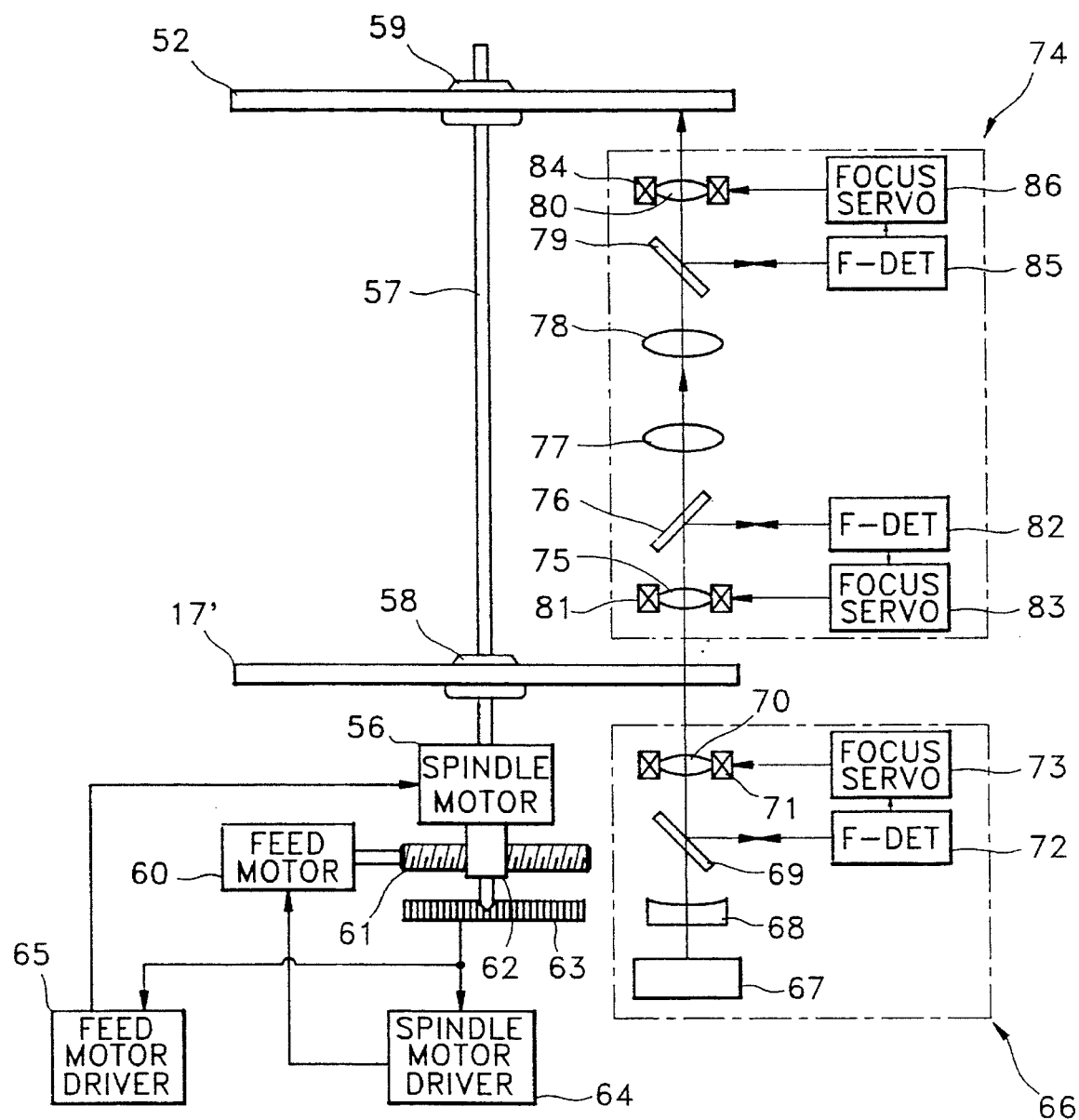
FIG. 9 is a block diagram showing the duplication apparatus for duplicating information from the source disc to the target disc according to the present invention.

In fabricating a source disc 17' storing the information shown in FIG. 2B, information is written in a source disc medium 17 shown in FIG. 2A, using an optical writing apparatus shown in FIG. 3, thus completing a source disc. In duplication, source disc 17' and a target disc 52 (shown in FIG. 7) are used, and the information on the source disc is duplicated on the target disc by means of the duplication apparatus (FIG. 9).

In FIG. 2A, source disc medium 17 has a transparent glass substrate 18 which has high transmittivity with respect to light. Glass substrate 18 is a circular disc and is the same size as an actual read only optical disc, whose one side has spirally formed land 19. Land 19 is provided for automatic tracking in an optical writing apparatus which will be described later. When the information is to be written in the same recording density as that of a common compact disc, the distance between the centers of land 19 is 1.6 μm. It should be appreciated that the recording density can be increased by shortening this distance. An opaque write layer 20 is thinly coated on one side of glass substrate 18 that is, the side having land 19. As shown in FIG. 2B, write layer 20 has write holes 21 for receiving the light, thereby storing information according to the arrangement of write holes 21. In order to optically form write holes 21, a material selected for write layer 20 has a low melting point and low boiling point, so that, when a light having a predetermined heat energy is projected so as to be focused on a portion thereof, the projected portion can be evaporated. For example, to form write holes 21 with a focused projection by means of a convergence lens whose numerical aperture is 0.75 and an argon (Ar-) gas laser of 200 mW, a tellurium (Te) compound having a low thermal conductivity and whose melting point is 449.8° C. and whose boiling point is 989.9° C., such as tellurium-selenium (Te-Se) or tellurium-antimony (Te-Sb), is utilized, The selenium or antimony included in the compound are respectively added to complement the weakness of pure Te which is susceptible to oxygen and humidity.

In writing desired information by the focused projection of a laser beam on source disc medium 17, a common mastering machine may be employed. However, an optical writing apparatus as shown in FIG. 3 according to the present invention automatically tracks land 19 included in source disc medium 17, thereby simply performing the writing.

In FIG. 3, a writing laser 22 emits a predetermined laser beam B1. An optical modulator 23 is operated by means of an oscillator 24 connected to an input circuit 25 for supplying data information to be written, to thereby modulate laser beam B1. Modulated laser beam B2 is focused on source disc medium 17, accurately on write layer 20 covering source disc medium 17, via a half mirror 26, a rotating mirror 27 and an objective lens 28.

Source disc 17' is held on a turntable 30 driven by a spindle motor 29, which are then both rotated by means of spindle motor 29. Also, since spindle motor 29 is loaded on a carriage 32 coupled to screw axis 31' of a feed motor 31, source disc medium 17 is horizontally transferred by the rotation of feed motor 31. Accordingly, by rotation and transfer of source disc medium 19, objective lens 28 spirally scans source disc medium 17. At this time, a linear scale 33 detects the amount by which carriage 32 has transferred, and sends the detected signal to a spindle motor driver 34. Spindle motor driver 34 controls spindle motor 29 according to the detected signal. Therefore, depending on the shifting of the scanning position on source disc medium 17, the speed of the spindle motor is increased or decreased to constantly maintain the linear velocity of the scanning position. Meanwhile, feed motor 31 is controlled by means of feed motor driver 35 which in turn controls feed motor 31 in accordance with an instruction by an optical detecting unit 36 to be described.

As shown in FIG. 4, optical detecting unit 36 detects both the focus and track error signals of a beam spot focused on source disc medium 17, and comprises detection laser 37, two beam-split prism 38 and 39, a focusing lens 40, a knife edge 41, two bisecting optical detectors 42 and 43, and two differential amplifiers 44 and 45. Detection laser 37 emits a laser beam B3 having a lower energy than that of write laser 22. After being reflected from half mirror 27, laser beam B3 is focused on source disc medium 17 (FIG. 3) along the same path as laser beam B2 which is modulated during writing. A laser beam B4 reflected from source disc medium 17 is partitioned into two separate beams in beam-split prism 39, so that one lands on optical detector 42 for focus error signal and the other lands on optical detector 43 for detecting track error signal via convergence lens 40 and knife edge 41. Thus, focus and track error signals are respectively output from differential amplifiers 44 and 45.

In FIG. 3, the focus error signal of optical detecting unit 36 is supplied to an actuator coil 47 for vertically driving objective lens 28 via a focus-servo 46. Meanwhile, the track error signal is simultaneously supplied to both actuator coils 50 for rotatably shaking rotating mirror 27 via a high-pass filter 48 and a track-servo 49, and feed motor driver 35 for controlling feed motor 31 via a low-pass filter 51.

Figure 5A:
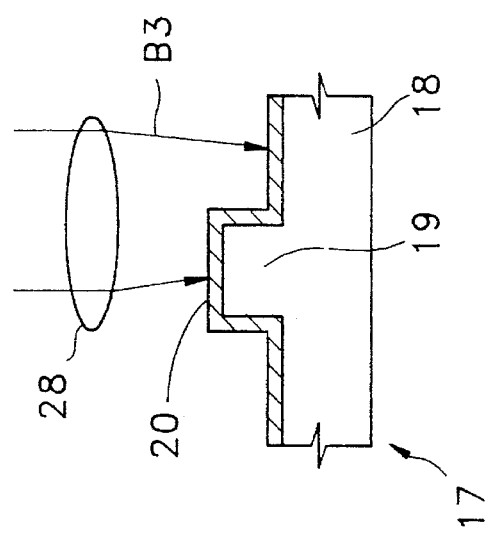
FIGS. 5A, 5B and 5C are sectional views showing the state of light projected to focus on the source disc medium, which is for illustrating automatic tracking of the optical writing apparatus according to the present invention.
Figure 5B:
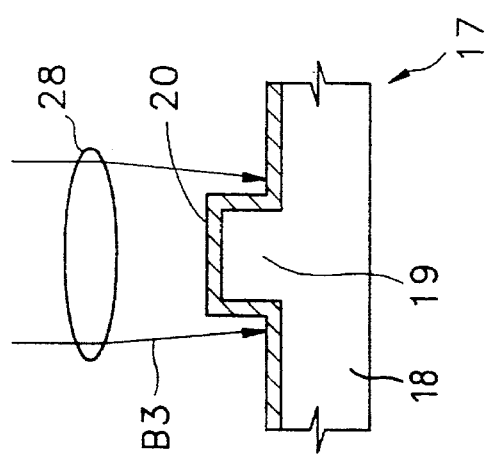
Figure 5C:
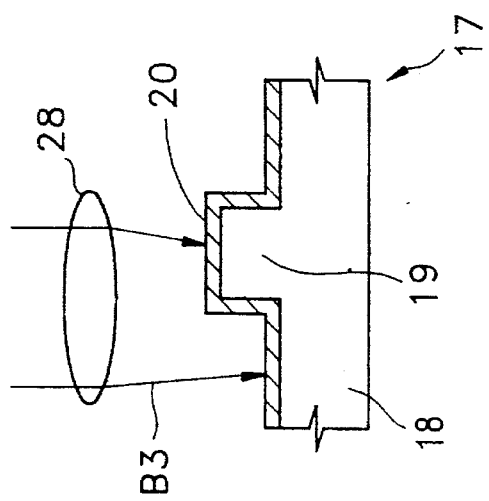
Figure 6A:
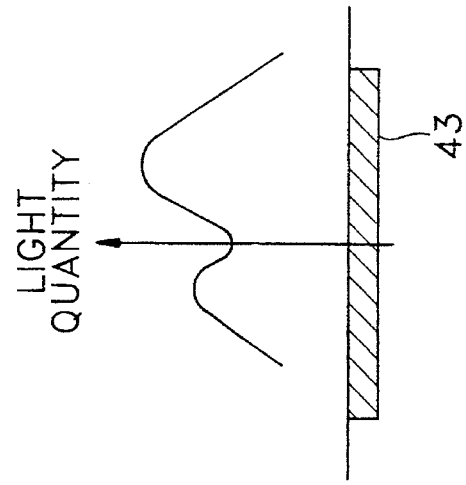
FIGS. 6A, 6B and 6C show the intensities of reflected light detected by the optical detector for the use of a track error signal, which are for illustrating the automatic tracking of the optical writing apparatus according to the present invention.
Figure 6B:
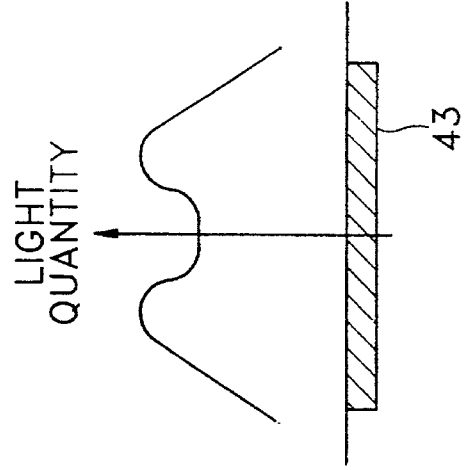
Figure 6C:
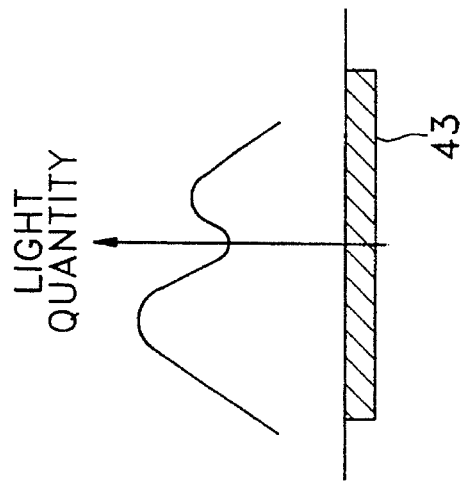

According to the above described optical writing apparatus, accurate writing can be carried out by automatically tracking land 19 in source disc medium 17. In more detail, when laser beam B3 for detection is precisely projected on a certain land of source disc medium 17 as shown in FIG. 5B, the light quantity of the reflected laser beam is distributed symmetrically as shown in FIG. 6B. Thus, equal light quantities are detected in each half of the split area of optical detector 43 for track error signal. Thus, the track error signal becomes zero. However, as shown in FIGS. 5A and 5C, if laser beam B3 is skewed in either direction, the light quantity is asymmetrically distributed as shown in FIGS. 6A and 6C. Under these circumstances, the light quantity is differently detected in the respective areas of optical detector 43, so that a track error signal of positive (+) or negative (−) is detected. When the positive or negative track error signal is detected, rotating mirror 27 and feed motor 31 shown in FIG. 3 are operated which thus corrects the track error. That is, since desired information is accurately written in the center of land 19 of source disc medium 17 by automatically tracking the land, the optical writing apparatus according to the present invention does not require high precision and advanced controlling performance, different from the mastering machine. As shown in FIG. 2B, upon finishing the writing, write holes 21 are formed on write layer 20 on land 19, so that source disc 17' which stores information according to the arrangement of write holes 21 is completed.

The present invention also provides a target disc as a read only optical disc in such a manner that the duplication of the information of source disc 17' is carried out onto the target disc which thus holds the same information.

Figure 7:
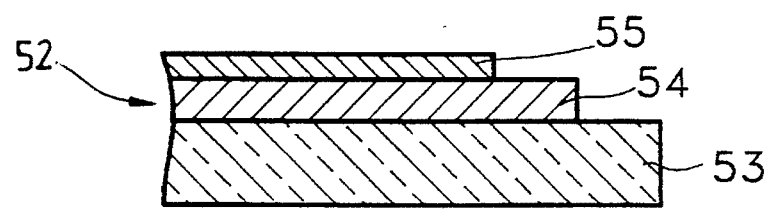
FIG. 7 is a schematic section view showing the structure of a target disc to be utilized in duplication of the present invention.
Figure 8:
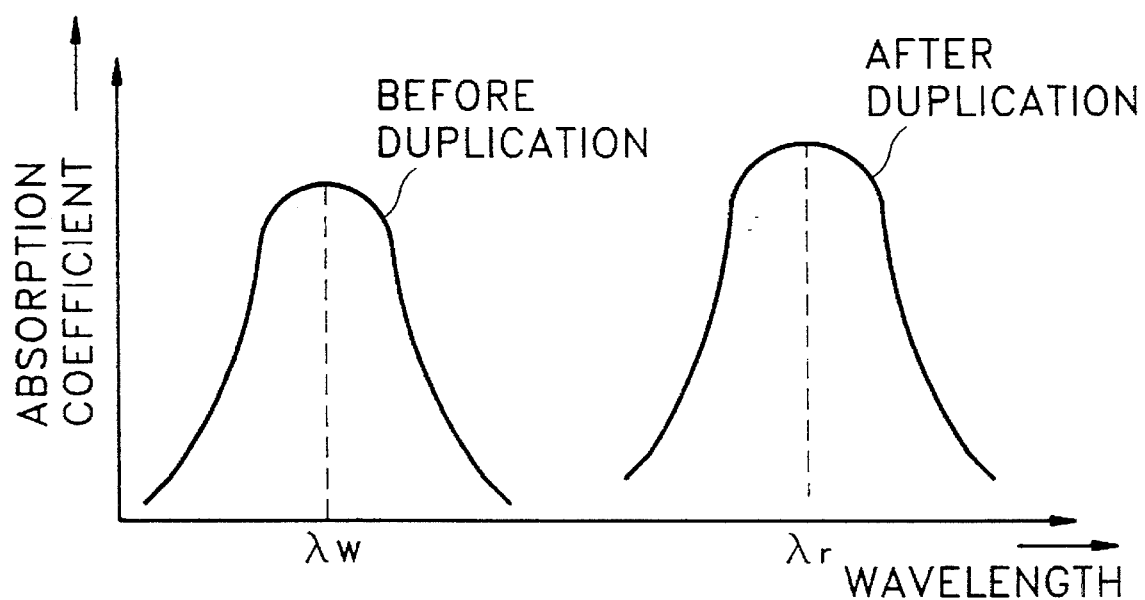
FIG. 8 is a characteristic graph of spectral distribution with respect to the write layer included in the target disc to be used in the present invention, wherein light wavelength is represented by the horizontal axis and absorption coefficient of the write layer is represented by the vertical axis.

FIG. 7 illustrates a target disc 52 which is employed in the present invention. Target disc 52 is composed of a sequentially stacked substrate 53, photochromic write layer 54 and reflective layer 55. As shown in FIG. 8, photochromic write layer 54 has a spectral distribution characteristic that, before duplication, an absorption coefficient α with respect to light peaks at a wavelength $\lambda_w$, and peaks at another wavelength $\lambda_r$ after duplication. Reflective layer 55 again reflects the light which has been transmitted to photochromic write layer 54. Such a target disc is described in Japanese laid-open patent No. hei 3-171443 in detail. Target disc 52 is fabricated in the same size as an actual read only optical disc, thereby enabling one-to-one duplication in the duplication apparatus which will be described.

FIG. 9 illustrates the duplicating apparatus for optically duplicating the information stored on source disc 17' to target disc 52. Here, source disc 17 and target disc 52 are inserted onto a rotation axis 57 of a spindle motor 56 and then is fastened by respective setters 58 and 59. Spindle motor 56 is loaded on a carriage 62 coupled to a screw axis 61 of a feed motor 60, and is horizontally transferred. Accordingly, source disc 17' and target disc 52 are rotated and horizontally transferred at the same time speed. A linear scale 63 detects the amount by which spindle motor 56 is transferred, so that a signal is supplied to a spindle motor driver 64 for controlling spindle motor 56 and a feed motor driver 65 for controlling feed motor 60. Therefore, respective driving motors 54 and 58 are controlled according to the transferred amount, so that source disc 17' and target disc 52 can be rotated at a constant linear velocity.

The duplication apparatus includes a light project apparatus 66 for project light on one side of source disc 17' and a light transferring apparatus 74 for transferring the light which transmits through source disc 17' to target disc 52.

Figure 10:
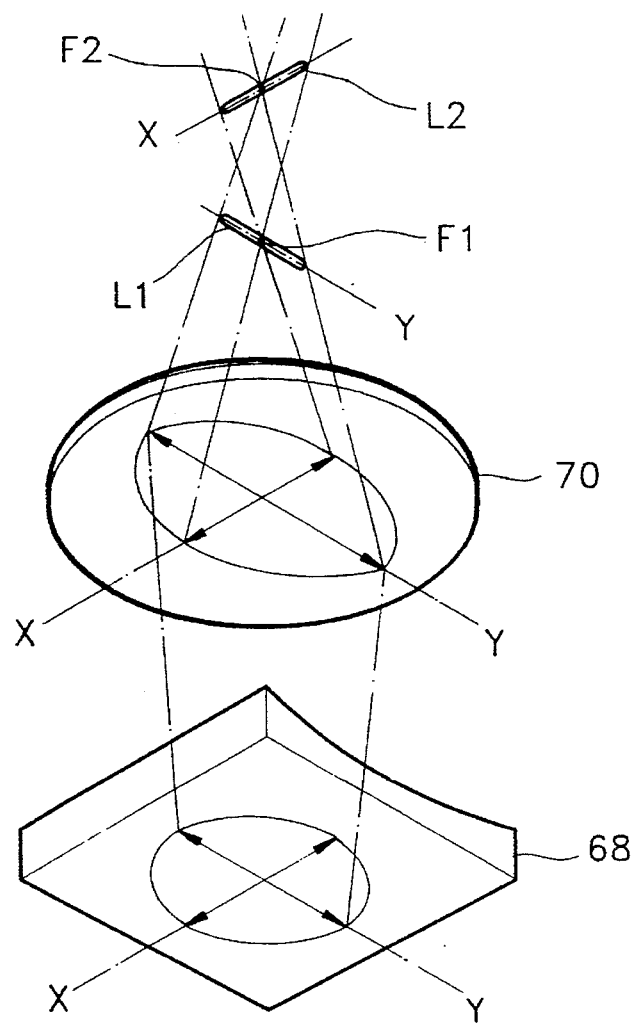
FIG. 10 is a perspective view showing a portion of a light-projecting unit in the duplication apparatus according to the present invention, for illustrating the state of light projected on the source disc.
Figure 11:
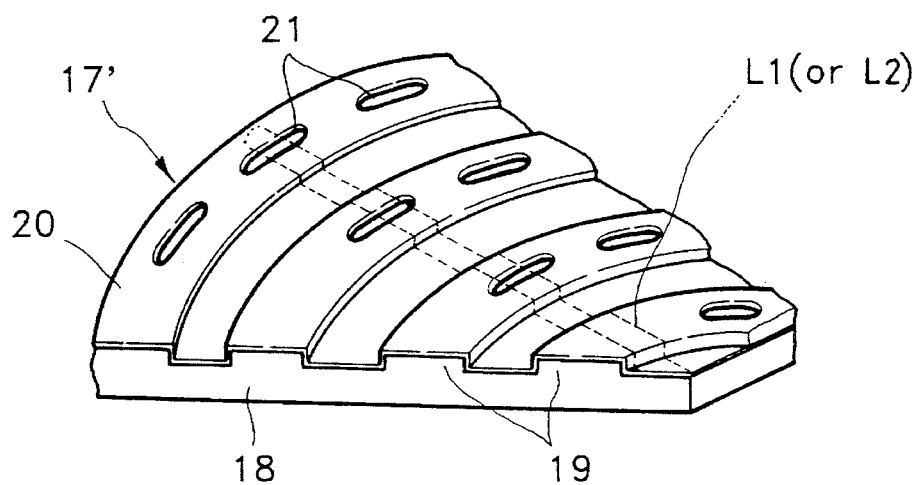
FIG. 11 is a perspective view of a portion of the source disc, showing the state of light projected on the source disc in the duplication apparatus according to the present invention.

Light project apparatus 66 has a light generator 67, a cylinder lens 68, a half mirror 69, a focusing lens 70, an actuator coil 71 for vertically driving focusing lens 70, a focus error signal detector 72 of focusing lens 70, and a focus-servo 73. Here, as shown in FIG. 10, cylinder lens 68 allows parallel incident light to transfer straight in the X-axis direction and to diverge it in the Y-axis direction. Then, focusing lens 70 converges only X-axis component on a first focal position F1 to thereby form a focal line L1 corresponding to the Y-axis direction, while only the Y-axis component is converged on a second focal position F2 which is beyond first focal position F1 to thereby form a focal line L2 corresponding to the X-axis direction. In the present invention, either of focal lines L1 or L2 is used for the converged light thereon to be projected to several land 19 of source disc 17'. By this projection, the light transits through write holes 21 formed in write layer 20 of lands 19. On the other hand, focus error signal detector 72 projects detecting light to source disc 17' via half mirror 69 and focusing lens 70, and sensed light reflected from source disc 17', thereby detecting a focus error signal of focusing lens 70. The focus error signal is supplied to actuator coil 71 via focus-servo 73. Accordingly, focusing lens 70 maintains a predetermined distance from source disc 17'. The light which transmits through write hole 21 of source disc 17' is projected to target disc 52 by means of light transferring apparatus 74.

Figure 12:
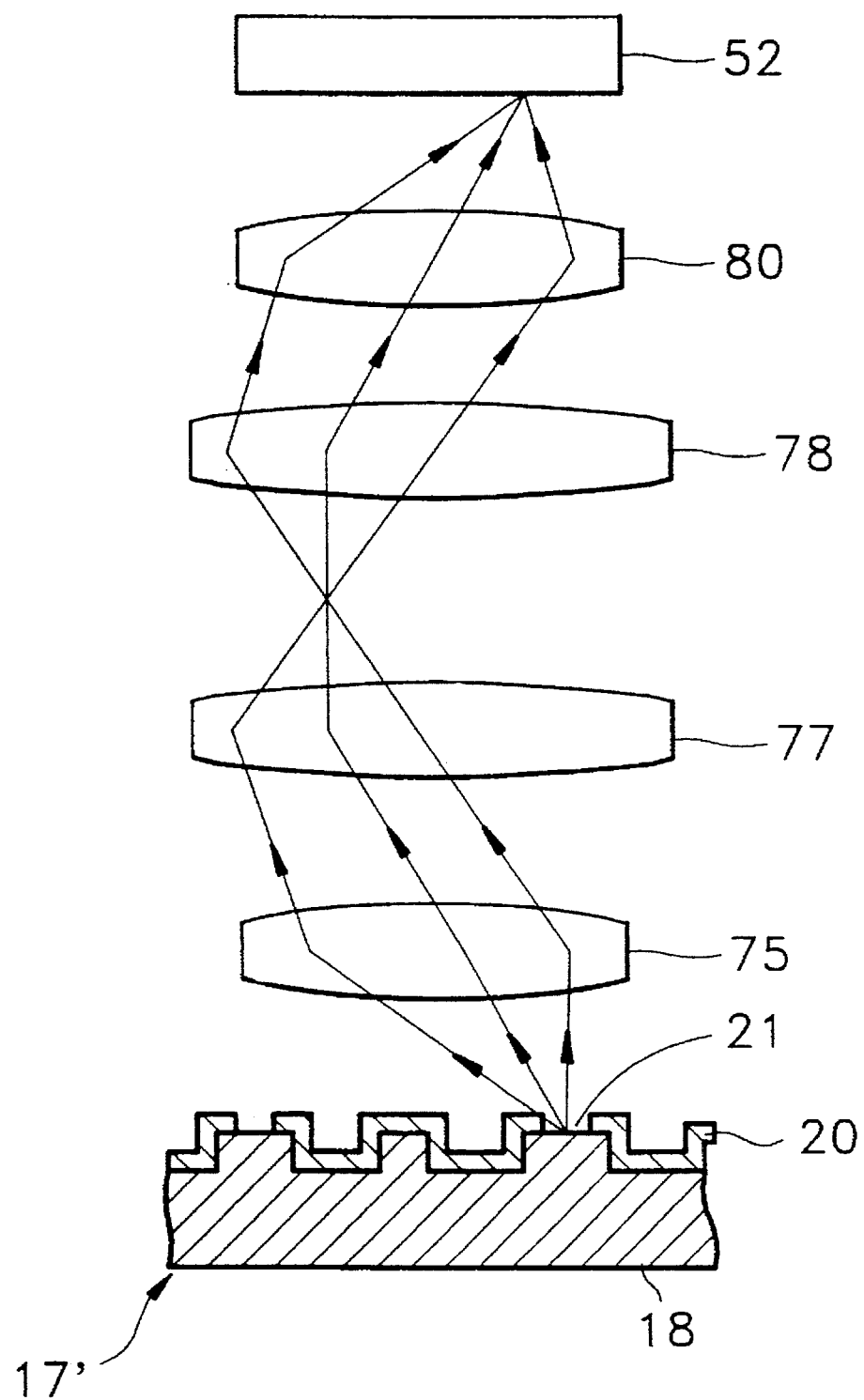
FIG. 12 is a detail view showing a light transferring unit between the source and target discs in the duplication apparatus according to the present invention.

Light transferring apparatus 74 has a pickup lens 75 for picking up the light which transmits write hole 21 of source disc 17', an objective lens 80 facing target disc 52, two half mirrors 76 and 79, transfer lenses 77 and 78, actuator coils 81 and 84 for focus-driving, focus error signal detectors 82 and 85, and focus-servos 83 and 86. Here, as shown in FIG. 12, pickup lens 75, objective lens 80 and two transfer lenses 77 and 78 are displaced to form a real image with a magnifying factor one in order to transfer the image corresponding to write hole 21 of source disc 17' to target disc 52 in the ratio of 1:1. Pickup lens 75 and objective lens 80 respectively maintain a predetermined distance from discs 17' and 52 by means of respective actuator coils 81 and 84, detectors 82 and 85 and servos 83 and 86. At this time, when the width of write holes 21 is set to 0.4 μm which is roughly the same as those of common compact or video discs, the wavelength of light for duplication is set to 500 nm. Also, the numerical apertures (NA) of pickup lens 75 and objective lens 80 for accurately transferring the image of write hole 21 of source disc 17' is obtained as below:

$$NA = \frac{1}{2} \times \frac{500 \times 10^{-9}}{4 \times 10^{-6}} = 0.625$$

The conditions for successful duplication according to the present invention are as follows.

First, the horizontal transferring distance by means of a feed motor for each rotation of a source disc cannot be longer than the length of focal lines converged on the first or second focuses. If the distance is longer, a spirally formed unduplicated area is formed.

Additionally, in order m prevent the write layer of the source disc from being damaged during duplication, the write layer must be formed to withstand light of a higher output power than can the photochromic write layer of a target disc. For example, assuming that a certain transformation of the photochromic write layer of the target disc occurs at a light intensity of 10 mW/μm$_2$, the write layer of the source disc must not be changed by such as light intensity. Of most importance is that the source disc can withstand a higher light intensity, considering the light transfer rate between the source and target discs. This condition can be easily satisfied.

Moreover, in setting a required light intensity for duplication, assuming that the optimum change occurs when a 10 mW laser beam is projected on the photochromic write layer of 1 μm$_2$ for 50 ns and the linear velocity of the disc is 10 m/s, the width of focal line projected on the disc is defined as:

$50 n \times 10 m/s = 0.5 \ \mu m$

Also, when the length of focal line is 200 μm, the projected area of the light which converges on the target disc becomes 100 μm$^2$. Thus, theoretically, the required laser output is more than:

$100 \ \mu m^2 \times 10 \ mW/\mu m^2 = 1000 \ nW$

However, in actual operation, the higher output should be set considering the light efficiency form the light source to the photochromic write layer of the target disc.

Under the state that the rotation linear velocity of the disc is 10 m/s and the length of the laser beam is 0.2 mm and along with the above-described conditions, approximately eleven seconds are required to duplicate a source disc, e.g., a common 30 cm-wide video disc, and approximately 4.1 seconds are required to duplicate one of compact-disc size.

In the present invention as described above, desired information is recorded on a source disc by transmitting the light, and is duplicated from the source disc to a target disc having a photochronic write layer, thereby providing a read only optical disc by the completely duplicated target disc. According to the present invention, since the number of fabrication processing is decreased, and simple optical writing apparatus and duplicating apparatus are employed (different from an expensive conventional apparatus for master formation, stamper formation and substrate molding), a read only optical disc can be fabricated more economically. Furthermore, in the present invention, the source disc storing the information can be permanently maintained, and a desired optical disc can be simply duplicated, as required.

As a result, mass production of a read only optical disc at low cost is possible using the present invention. Also, due to the economic advantage, the present invention is favorable to making read only optical discs commercially available via short-run production.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. A method for fabricating a read only optical disc, said method comprising the steps of:

fabricating a source disc by (a) coating a transparent substrate having a predetermined number of lands with an opaque write layer, and (b) forming write holes for transmitting light onto said write layer on said lands so that said source disc stores data in accordance with said write holes, and duplicating said data in said source disc onto a target disc having a photochromatic write layer, wherein said source disc and target disc are placed with a predetermined distance therebetween, by (a) projecting a focused laser beam onto one side of said source disc, (b) forming a data image with said focused laser beam passing through each of said write holes by using optical means located between said source disc and target disc, and (c) exposing said photochromatic write layer of said target disc to said data image so that said target disc stores said data, wherein said optical means has a magnification factor of positive one.

2. A method for fabricating a read only optical disc as claimed in claim 1, wherein said source and target discs are substantially the same size and are supported on one shaft of one motor to rotate simultaneously.

3. A method for fabricating a read only optical disc as claimed in claim 1, wherein said focused laser beam is converged i the form of a focal line by using a cylindrical lens.

* * * * *